(No Model.)

W. H. JOHNSON.
CLUTCH.

No. 456,827. Patented July 28, 1891.

Witnesses
Albert Speiden

Inventor
W. H. Johnson
By his Attorney
E. H. Bates

UNITED STATES PATENT OFFICE.

WILLIAM H. JOHNSON, OF BROOKLYN, NEW YORK.

CLUTCH.

SPECIFICATION forming part of Letters Patent No. 456,827, dated July 28, 1891.

Application filed April 1, 1891. Serial No. 387,265. (No model.)

*To all whom it may concern:*

Be it known that I, WILLIAM H. JOHNSON, a citizen of the United States, residing at Brooklyn, in the county of Kings and State of New York, have invented certain new and useful Improvements in Clutches for Dynamo-Electric Machines; and I do hereby declare the following to be a full, clear, and exact description of the invention, such as will enable others skilled in the art to which it appertains to make and use the same.

My invention relates to clutches for dynamo-electric machines; and it consists in the construction and novel combination of parts, as hereinafter fully described and claimed.

Figure 1:
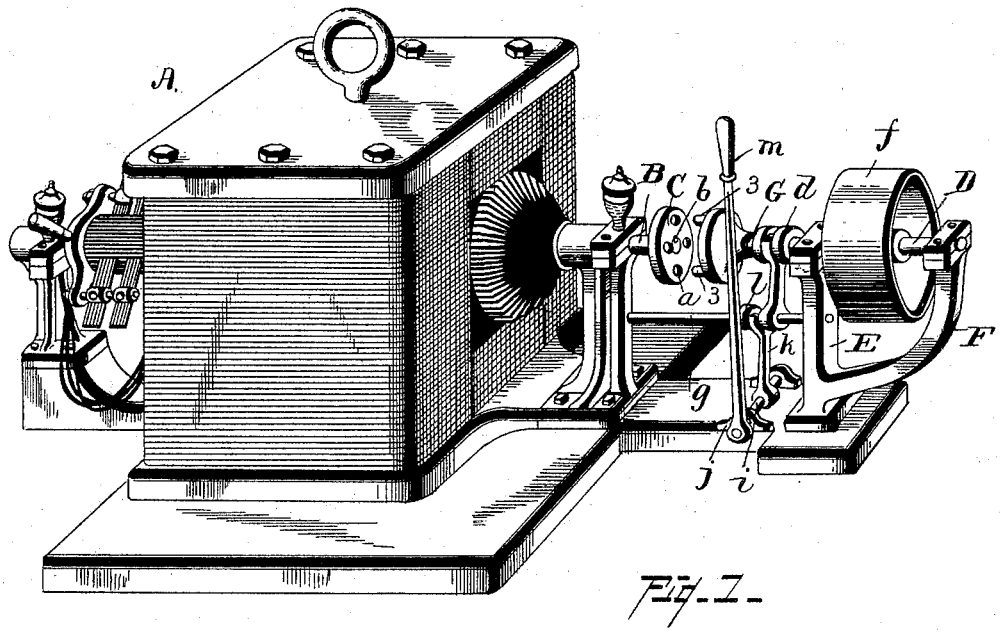
Figures 2, 3:
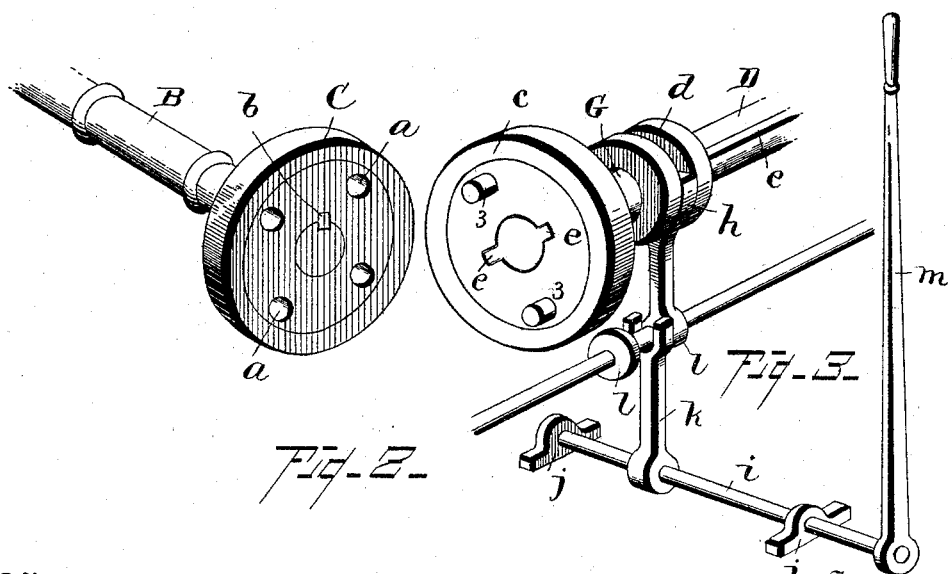

In the drawings, Figure 1 is a view in perspective of a dynamo-electric machine and clutch embodying the improvements of my invention. Fig. 2 is a view in detail of the non-sliding or female portion of the clutch. Fig. 3 is a detail perspective view of the sliding or male portion of the clutch.

Referring by letter to the accompanying drawings, A designates a dynamo-electric machine of any preferred construction, to which the clutch mechanism hereinafter described is shown applied.

B is the shaft of the dynamo-machine, which shaft is supported in suitable bearings and is provided on its inner projecting end with a half-clutch C, which is provided with four radially-disposed seats $a$ $a$, and is fixed upon the shaft B by a key $b$, so that the half-clutch C will be rotated when the shaft B is revolved by the action of the dynamo.

D designates the shaft of the clutch mechanism, which shaft is supported in bearings in the upper end of a standard E and an arm F, projecting outwardly and extending upwardly therefrom, and this shaft D is provided with a sleeve G, having at its inner end a half-clutch $c$ and at its outer end a grooved collar $d$. The sleeve G is prevented from turning on the shaft D by splines $e$ and $e$, which fit in grooves in the interior of the sleeve, but at the same time permit said sleeve to be shifted back and forth on the shaft D. The half-clutch $c$ is provided on its inner face with pins 3 3, which fit into seats $a$ $a$ in the face of the half-clutch C when the sliding half-clutch $c$ is moved into engagement with the half-clutch C. A pulley $f$ is provided on the shaft D, from which a belt may be run to drive the machinery desired to be driven. A shaft $g$ is provided with a fork $h$, which engages the grooved collar $d$ on the sliding sleeve. A rock-shaft $i$ is supported in bearings $j$ $j$, and is connected to the guide-rod $g$ by a forked arm $k$, which engages said guide-rod between the collars $l$ and $l$. The rock-shaft $i$ is provided with a rocking lever $m$, which is operated to shift the sleeve G, to throw the sliding half-clutch into and out of gear with the clutch C to start and stop the pulley when desirable or necessary, which of course will serve to stop the machinery with which the driving-pulley is connected.

Having thus fully described my invention, what I claim as new, and desire to secure by Letters Patent, is—

In a clutch mechanism for a dynamo-electric machine, the combination of the clutch-shafts B D, the latter provided with the collar $d$, the rod $g$, having the collar $l$ and having its end bearings in the standards of the machine, the forked arm $h$, and forked arm $k$, transverse rod $i$, and handle-lever $m$, the whole arranged as shown and described.

In testimony whereof I affix my signature in presence of two witnesses.

WILLIAM H. JOHNSON.

Witnesses:
GEO. O. VAN VOOST, Sr.,
JOHN D. MÜLLER.